United States Patent [19]

Christopher

[11] Patent Number: 4,841,466
[45] Date of Patent: Jun. 20, 1989

[54] BIT-SERIAL INTEGRATOR CIRCUITRY

[75] Inventor: Todd J. Christopher, Indianapolis, Ind.

[73] Assignee: RCA Licensing Corporation, Princeton, N.J.

[21] Appl. No.: 88,340

[22] Filed: Aug. 24, 1987

[51] Int. Cl.[4] .............................................. G06F 7/50
[52] U.S. Cl. ...................................... 364/733; 377/49; 377/72
[58] Field of Search ............... 364/733, 768, 780, 782, 364/785; 328/127; 377/49, 72, 78, 80, 81

[56] References Cited

U.S. PATENT DOCUMENTS

| 3,757,261 | 9/1973 | Sather | 364/733 |
| 4,023,019 | 5/1977 | Leibowitz et al. | 364/733 |
| 4,246,642 | 1/1981 | Magill | 364/733 |

FOREIGN PATENT DOCUMENTS

| 105347 | 6/1983 | Japan | 364/733 |
| 262248 | 12/1985 | Japan | 364/733 |
| 739566 | 6/1980 | U.S.S.R. | 364/733 |

OTHER PUBLICATIONS

H. Urkowitz, "Analysis & Synthesis of Dela-Line Periodic Filters", IRE Transactions on Circuit Theory, Jun. 1957, pp. 41–53.

D. A. Linden & B. D. Steinberg, "Synthesis of Delay Line Networks", IRE Transactions on Aeronautical & Navigation Electronics, Mar. 1957, pp. 34–39.

Primary Examiner—Eugene R. Laroche
Assistant Examiner—Benny Lee
Attorney, Agent, or Firm—E. M. Whitacre; E. P. Herrmann

[57] ABSTRACT

A bit-serial integrator includes the cascade combination of a bit-serial adder, a first bit-serial register and a second bit-serial register. Input signal is applied to one input of the adder and the output terminal of the second bit-serial register is coupled to a second input of the adder. A transparent latch is coupled to an output of the first bit-serial register and is conditioned to pass a predetermined number of sample bits and then to latch and output a particular sample bit for the duration of a sample period. The output of the latch is an integrated, scaled and truncated representation of the input signal.

6 Claims, 2 Drawing Sheets

BIT-SERIAL INTEGRATOR CIRCUITRY

This invention relates to circuitry for providing an integration function in a gated clock, bit-serial system.

BACKGROUND OF THE INVENTION

It is known in the art of digital circuitry to perform integration by using a delay element and an adder circuit. The signal to be integrated is applied to one input (addend) of the adder circuit. The output of the adder circuit is coupled to the input of the delay element, the output of which is coupled to the second input (augend) of the adder circuit. The integrated signal may be taken from either the output of the adder circuit or the output of the delay element. See for example the article by H. Urkowitz, "Analysis and Synthesis of Delay Line Periodic Filters," IRE Trans. on Circuitry Theory, June 1957, pp 41–53.

Frequently it is desired to both scale and truncate the values provided by the integrator. Truncation is performed in order to reduce the number of sample bits processed, in order to reduce the size of the processing circuitry or minimize the processing time. It has been found that undesirable effects may occur if the truncation is performed in the integrator loop, that is, between the delay element and the adder. These effects are manifested as inaccuracies in the processed signals, undesirable excess signal build up for certain signals and possible oscillations or limit cycles. It is an object of the present invention to provide a bit-serial integrator circuit which provides both scaling and truncation; provides integration with full bit accuracy, and requires a minimum of hardware.

SUMMARY OF THE INVENTION

The present invention is directed to a bit-serial integration circuit including a signal combining means serially coupled with an R-stage shift register. The output of the R-stage shift register is coupled through an N-stage shift register to a first connection of the combining means and the signal to be integrated is coupled to a second input connection of the combining means. A gated clock source providing at least R+N pulses per sample period is coupled to the shift-registers to transfer sample bits serially there through. Truncated, scaled and integrated R-bit samples are available at the output connection of the R-stage shift register.

DETAILED DESCRIPTION

Figure 2:
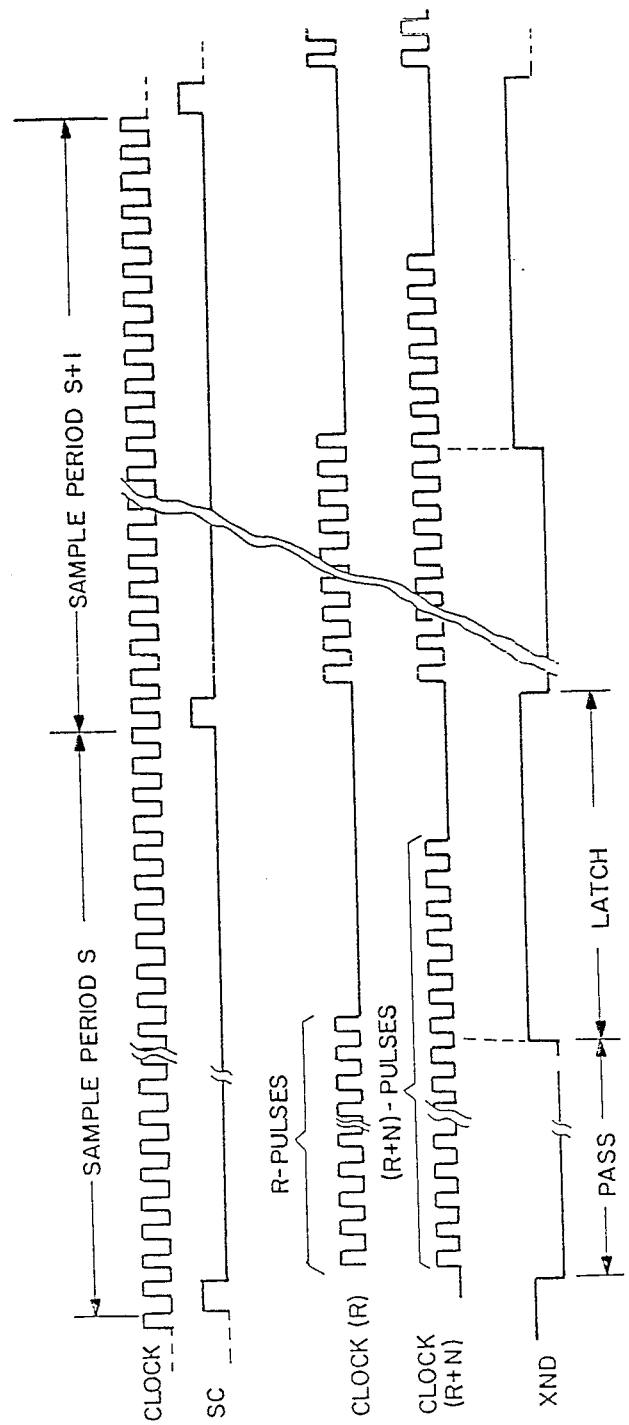
FIG. 2 is a waveform diagram useful in describing the invention.

The invention will be described in the enviornment of a bit-serial gated clock system. The samples to be processed are R-bit, two's complement bit-serial samples. Referring to FIG. 2, samples occur synchronously at a rate defined by the sample clock designated SC. The sample bits occur synchronously with the burst of clock pulses of the clock signal designated CLOCK R with the least significant bit (LSB) occurring first in time and the most significant or sign bit (MSB) occurring last. The period of the burst of clock pulses of CLOCK R is less than the sample period. The pulses of the clocking signal CLOCK R are developed from a system clock designated CLOCK which is a continuous waveform.

Figure 1:
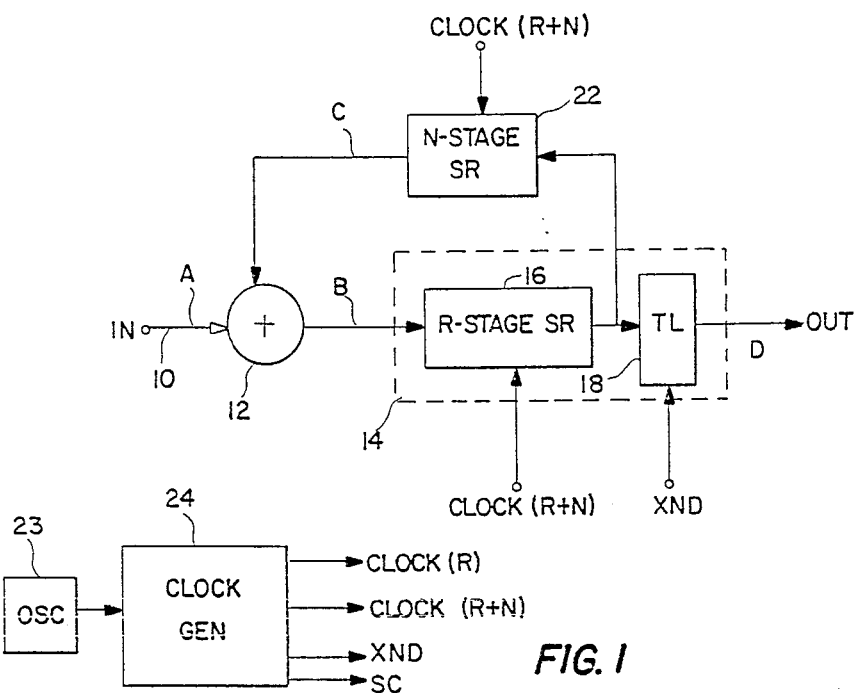
FIG. 1 is a block diagram of a bit-serial integration circuit embodying the present invention.

Referring to FIG. 1, the integration circuit includes an adder 12 having a first input terminal 10 at which samples to be integrated are applied. The output of the adder 12 is coupled to a sign-extend-shift-register (SXSR) 14 including an R-stage serial shift register 16 and a transparent latch (TL) 18. The transparent latch 18 is controlled by a bilevel control signal XND and passes sample bits unaltered for signal XND in a first state and latches the bit occurring concurrently with a transition of the signal XND going from the first state to a second state and holds and outputs that bit for the duration that signal XND is in the second state. The output of the transparent latch is a scaled output of the integrated signal. The output of the serial register 16 is coupled to an N-stage serial shift register 22, the output of which is coupled to a second input of adder 12. Shift registers 22 and 16 are clocked with bursts of (R+N) clock pulses per sample period by clock signal CLOCK (R+N) whose relationship to CLOCK (R) is shown in FIG. 2.

The control signal XND (illustrated in FIG. 2) undergoes a transition from the first to second state during the Rth clock pulse so that the Rth sample bit output by register 16 is latched and therefore replicated for the remainder of the duration of the current sample period.

The clock signals are generated by, for example, an oscillator 23 which develops the system clock, CLOCK, and a clock generator 24. The clock generator 24 responsive to the system clock develops the signals CLOCK (R), CLOCK (R+N), XND and if required signal SC. These signals are developed in clock generator 24 by conventional means, the details of which are not part of this invention, which circuitry one skilled in the art of signal processing will readily be capable of designing knowing the timing relationships illustrated in FIG. 2.

Consider a sequence of R-bit, two's complement, bit-serial samples being applied to input connection 10 with the Rth or sign bit of each sample replicated for the duration of the respective sample period after the occurrence of the R-1 value bits. The sign bit replication may be provided for example by applying the samples to connection 10 via a transparent latch controlled by the control signal XND. Assume also that the contents of registers 16 and 22 are initially zero valued and that adder 12 imposes no processing delay on the applied signal. During the sample period that the first sample is applied, since the contents of register 16 and 22 are zero valued, the first sample passes through adder 12 unchanged and, after the first R pulses of clock signal CLOCK (R+N), is resident in shift register 16. During this interval the output OUT is zero valued, that is the zero valued contents originally in register 16 are passed through the transparent latch 18. Latch 18 latches the Rth output bit and replicates it for the duration of the sample period thus precluding further bit values provided by register 16, during the sample period, from being output on terminal OUT.

Register 16 is clocked for an additional N clock periods providing the N LSB'S of the sample to the N-stage shift register 22. At the beginning of the next sample period, the first sample is thus available at the second input of adder 12 and properly justified for addition to the next applied sample. That is the LSB and subsequent bits of the first sample resident in register 22 will occur coincidently with the LSB and corresponding bits of the subsequent (second) sample applied to connection 10.

At the end of the first sample period (and every subsequent sample period) only the R MSB's of the sum samples are resident in register 16 since register 16 is an R-stage register and it is clocked with R+N pulses. (Note that even though the input samples are R-bits wide, the sum samples can expand to R+N bits wide.) During each subsequent sample period the R MSB's of the sums are provided as the output signal OUT via the transparent latch 18. The R MSB's of the sum samples are output coincident with the first R pulses of the burst of clock pulses. The output samples are representative of the sum samples provided by adder 12, truncated and shifted to N lesser significant bit positions. The shifting of the sum samples to N lesser significant bit positions is equivalent to scaling the sum samples by a factor of $2^{-N}$.

The samples fed back to the adder 12 via register 22, however, are not truncated nor are they scaled. Thus the integration is performed with full precision.

Designating the values of the input samples as A, the sum samples as B, and the samples fed back via register 22 as C, the transfer function of the circuit is derived as follows. The sample C is equal to the sample B delayed by one sample period and using conventional Z-transform notation $$C = BZ^{-1} \tag{1}$$

Sum samples B are equal to $$B = A + C \tag{2}$$

or $$B = A + BZ^{-1} \tag{3}$$

collecting terms and rearranging equation (3)

$$B/A = 1/(1 - Z^{-1}) \tag{4}$$

Equation (4) describes the integration function in Z-transform notation.

Designating the output samples OUT as D $$D = 2^{-N} BZ^{-1} \tag{5}$$

and substituting (4) in (5) the transfer function D/A is given by $$D/A = 2^{-N} Z^{-1}/(1 - Z^{-1}) \tag{6}$$

indicating that the output equals the integration of the input signal delayed one sample period and scaled by $2^{-N}$.

In the arrangement of FIG. 1, the sums provided by adder 12 may expand to bit widths of R+N since there is a total series combination of R+N shift register stages. Further, if it is desired to feed back to adder 12, sum samples scaled by $2^{-x}$, then the number of stages of register 22 may be reduced by X and a transparent latch interposed between register 22 and adder 12, which latch being conditioned to latch and replicate the sample bit occurring at the (R+N−X)th clock pulse.

In the FIG. 1 arrangement, it was assumed that adder 12 imposed no processing delays. If, however, adder 12 imposes Y bit periods of processing dalay, then the samples B will be multiplied by $2^Y$ and the transfer function B/A will be altered.

This factor may be partially compensated by reducing the number of stages in register 22 by Y stages. In this instance the transfer functions B/A and D/A are given by $$B/A = 2^Y/(1 - Z^{-1}) \tag{7}$$

and $$D/A = 2^{-(N-Y)} Z^{-1}/(1 - Z^{-1}) \tag{8}$$

Alternatively if the adder imposes Y bit-periods of processing delay, the transfer functions of equations (4) and (6) can be maintained intact by increasing the number of pulses in each burst of clock pulses by Y with no other changes made to the circuit elements 16 and 22. In this instance, the clock signals applied to registers 16 and 22 will contain R+N+Y pulses in each burst.

Figure 3:
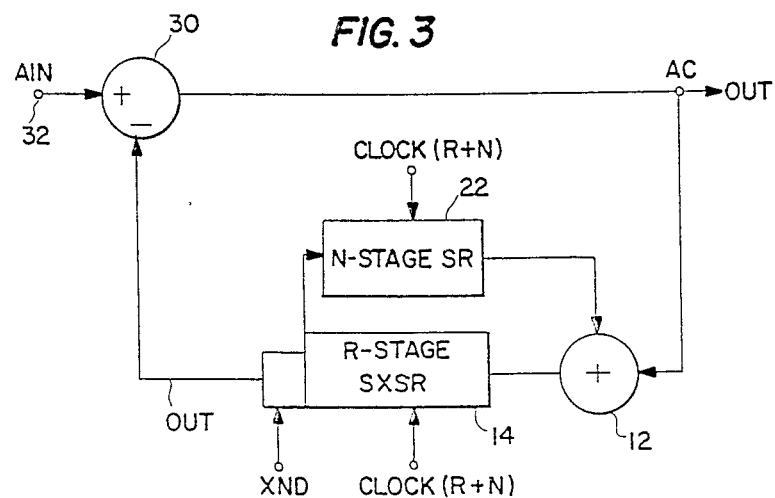
FIG. 3 is a block diagram of circuitry for eliminating the DC component of a bit-serial signal including the integration circuit of FIG. 1.

Refer next to FIG. 3. The elements in FIG. 3 designated with the same numbers as elements in FIG. 1 are presumed identical. The circuitry in FIG. 3 may be employed to remove a DC component from a bit-serial signal such as a bit-serial audio signal. Presume for example that the signal applied to terminal 32 is an unsigned straight binary signal from an analog-to-digital convertor and all values are positive. The conversion process inherently imposes a DC reference on the digitized signal. The audio signal from, for example, a broadcast source is nominally an AC signal. The DC component, if not removed, will in general, require that the processing circuitry be capable of processing a signal of greater dynamic range than that required by the AC audio signal. Thus to minimize the overall signal processing hardware it is desirable to remove the DC component.

The FIG. 3 circuit includes a bit-serial two's complement subtractor circuit 30 and an integrator circuit as described with reference to FIG. 1. The input signal (AIN) is coupled to the minuend input of the subtractor 30 and the integrator terminal OUT is coupled to the subtrahend input of the subtractor 30. Note in fact, that the subtractor 30 and adder 12 may in fact be interchanged if the signal $AC_{OUT}$ is coupled to the subtrahend input of the subtractor interchanged with adder 12.

The signal $AC_{OUT}$ is equal to the difference of the signal AIN minus the output OUT from the integrator. The signal OUT from the integrator is, from equation (6), $$OUT = AC_{OUT} 2^{-N} Z^{-1}/(1 - Z^{-1}). \tag{9}$$

Therefore, $$AC\text{OUT} = AIN - AC_{OUT} 2^{-N} Z^{-1}/(1 - Z^{-1}) \tag{10}$$

Collecting terms and rearranging the transfer function $AC_{OUT}/AIN$ of the FIG. 3 circuit can be shown to be $$AC_{OUT}/AIN = (Z - 1)/(Z - 1 + 2^{-N}). \tag{11}$$

For sample periods that are small relative to the reciprocal of the maximum frequency of the signal of interest, this transfer function contains a zero at zero Hz and a pole at approximately $2^{-N} fs/2\pi$ Hz, where fs is the sample frequency. The audio bandwidth is 20 Hz–20 kHz. Assume a sample rate of 300 kHz to satisfy the criteria that the sample period be small relative to the period of the maximum audio-frequency. In order not to lose any of the audio signal spectrum the pole must be at a frequency less than 20 Hz or $$2^{-N}fs/2\pi < 20. \qquad (12)$$

This condition is satisfied for N less than 11. For N equal to 12 the 3 dB point is at 11.6 Hz and for N equal to 13 the 3 dB point is reduced to 5.8 Hz. Thus the AC audio signal will pass substantially with no amplitude loss and the DC component will be completely eliminated.

Now assume that the subtractor 30 and adder 12 each impose a one-bit period delay on the signal samples. Relative to the sample datum established in a gated clock system, a one bit period delay effectuates a multiplication by a factor of two. The output from subtractor 30 becomes $$AC_{OUT} = 2(AIN\text{-}OUT) \qquad (13)$$

The signal OUT, in accordance with equation (8) becomes $$OUT = AC_{OUT} 2^{-(N-1)} Z^{-1}/(1-Z^{-1}) \qquad (14)$$

Substituting (14) in (13), collecting terms and transposing, the transfer function can be shown to be $$AC_{OUT}/AIN = 2(Z-1)/(Z-1+2^{-(N-2)}). \qquad (15)$$

Again there is a zero at zero Hertz, however, in this instance the pole is at $2^{-(N-2)}fs/2\pi$ Hz and the amplitude is increased by a factor of two. To establish the pole at the same frequency as the previous example, N must be increased by two.

In the claims that follow, the phrase "burst of clock pulses" is recited. The "burst of clock pulses" may occupy an entire sample period or it may occupy less than an entire sample period depending on the particular circuit elements selected i.e. the number of register stages and the sample period. If the burst occupies the entire sample period, the clock signal will occur as a continuous string of pulses, that is, successive burst will be immediately adjacent one another without apparent separation. The term "burst of clock pulses" as used in the claims is intended to include this contingency.

What is claimed is:

1. A bit-serial integrator circuit for integrating a bit-serial signal comprising:
   a signal input terminal for applying a bit-serial signal;
   combining means for combining bit-serial signals, having a first input terminal coupled to said signal input terminal, a second input terminal and an output terminal;
   a first serial shift register having R stages, R being an integer, an input terminal coupled to the output terminal of said combining means, an output terminal and a clock input terminal;
   a second serial shift register having N stages, N being an integer, an input terminal coupled to the output terminal of said first serial shift register, an output terminal coupled to the second input terminal of said combining means, and a clock input terminal;
   means for applying a burst of clock pulses to the clock input terminals of said first and second serial shift registers, the pulses in said burst being synchronous with occurring bits of said bit-serial signal, and the number of pulses in said burst being at least R+N per sample period; and
   transparent latch means, having a signal input coupled to the output terminal of said first serial shift register for passing sample bits during a first predetermined portion of said burst and latching and outputting a predetermined sample bit for the duration of each sample period following said predetermined portion.

2. The bit-serial integrator set forth in claim 1 wherein the means for applying a burst of clock pulses provides a burst of pulses equal in number to processing delays, measured in integer bit-periods, occurring between an input terminal of said combining means and the output terminal of said second serial shift register.

3. The bit serial integrator set forth in claim 2 wherein said combining means has a processing delay of one sample bit period between its input and output terminals and said means for applying a burst of clock pulses provides a burst of pulses equal in number to R+N+1.

4. In combination:
   bit-serial combining means for combining bit serial binary signal, having first and second input terminals and an output terminal;
   a first bit-serial shift register having R stages (R an integer), having an input terminal coupled to the output terminal of said bit-serial combining means, having an output terminal, and having a clock input terminal for applying a first clock signal to synchronously shift bit-serial samples through said stages;
   a second bit-serial shift register having N stages (N an integer), having an input terminal coupled to the output terminal of said first bit-serial shift register, having an output terminal coupled to the second input terminal of said bit-serial combining means, and having a clock input terminal for applying a second clock signal to synchronously shift bit-serial samples through its stages;
   a bit-serial transparent latch means having an input terminal coupled to the output terminal of said first bit-serial shift register and having an output terminal at which processed bit-serial signal is available, said transparent latch means conditioned in a first state to pass a predetermined number of sample bits of a bit-serial sample applied to said transparent latch means, and conditioned in a second state to latch and output a predetermined bit of said bit-serial sample for the duration of a sample interval after the occurrence of said predetermined bit of said bit-serial sample.

5. The combination set forth in claim 4 further including means for applying said first and second clock signals to said clock input terminals, said first and second clock signals occurring in recurring bursts of pulses, said bursts including at least (R+N) pulses per burst.

6. The combination set forth in claim 5 further including:
   a further bit-serial combining means having a first input terminal coupled to the output terminal of said bit-serial transparent latch means, an output terminal coupled to the first input terminal of said combining means and at which a processed signal is available, and having a second input terminal; and
   means for applying a bit-serial signal to the second input terminal of said further bit-serial combining means.

* * * * *